April 8, 1969   A. P. HAUEL ET AL   3,437,525
FUEL CELL WITH TITANIUM-CONTAINING ELECTRODE
AND PROCESS OF USE THEREOF
Filed Jan. 20, 1964
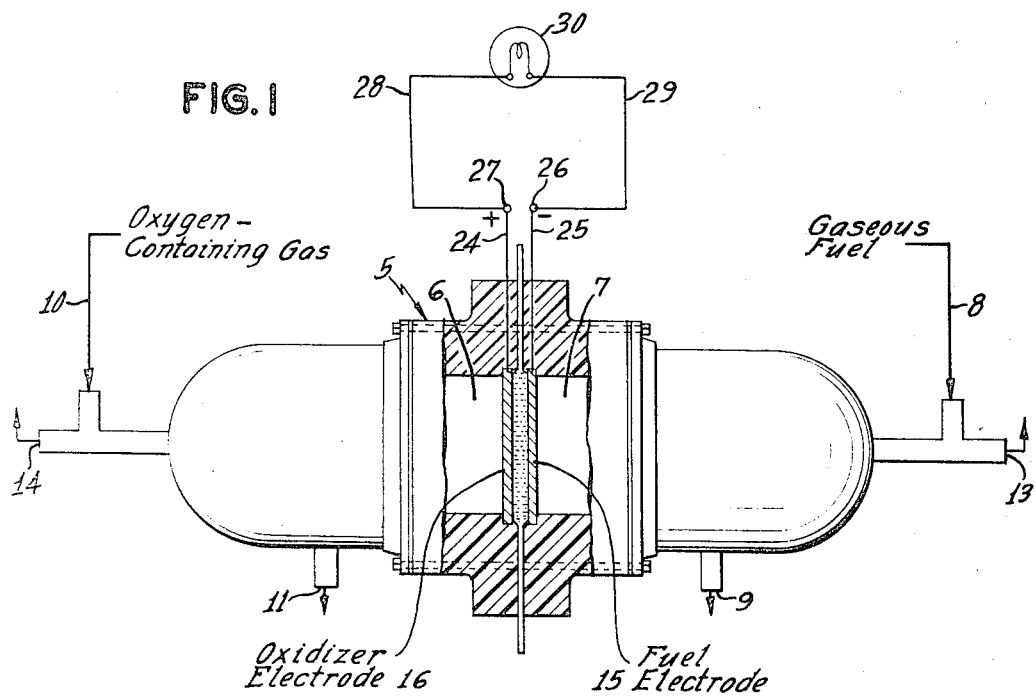
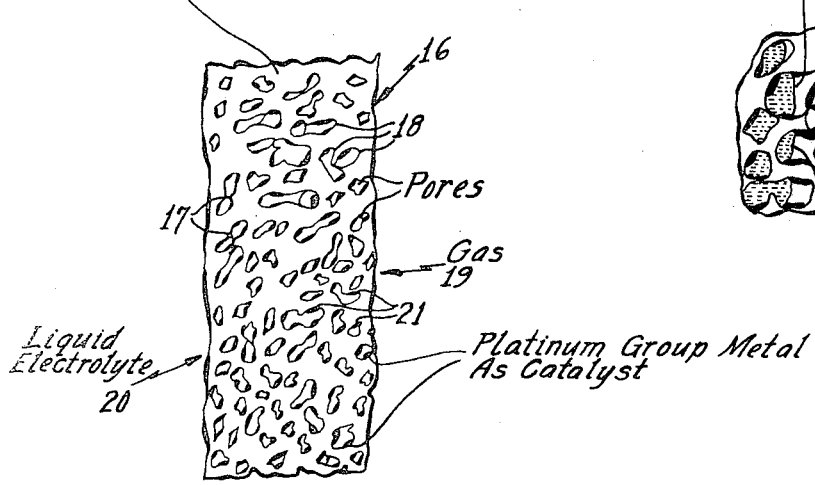
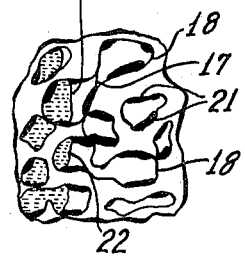
INVENTORS
Anna P. Hauel
James S. Hill
William E. Reilly
BY
Roger L. Drew
ATTORNEY United States Patent Office 3,437,525
Patented Apr. 8, 1969

3,437,525
FUEL CELL WITH TITANIUM-CONTAINING ELECTRODE AND PROCESS OF USE THEREOF
Anna P. Hauel, West Orange, James S. Hill, Cranford, and William E. Reilly, Westfield, N.J., assignors to Engelhard Industries, Inc., Newark, N.J., a corporation of Delaware
Filed Jan. 20, 1964, Ser. No. 338,864
Int. Cl. H01m 27/10
U.S. Cl. 136—86                 6 Claims This invention relates to fuel cells and more particularly to fuel cells having new and improved electrodes, the electrodes per se, and the preparation of such electrodes.

Fuel cells, which are devices for the direct conversion of a fuel to electrical energy, are well known. The cells are composed of an oxidizer electrode, a fuel electrode and an electrolyte. When gaseous reactants are utilized, the cells are usually equipped with porous diffusion electrodes which typically include a catalyst. Various materials have been employed in the past for fabricating the porous electrodes. One of these materials is carbon. Although carbon is satisfactory for fabricating the electrodes in certain respects, difficulties are encountered with carbon electrodes. Wetproofing of the carbon electrodes is necessary to establish and maintain the three phase interface between gaseous reactant, liquid electrolyte and solid catalyst. However, most wetproofing materials will not stand up at elevated temperatures. Further, differences in wetproofing rather than differences in intrinsic catalytic activity may determine differences in electrode performance, and wetproofing tends to interfere with exposure of the catalytic surface at elevated temperatures. Moreover, carbon electrodes tend to oxidize at elevated temperatures and thus it is difficult to control the porosity of carbon electrodes.

The preparation of porous diffusion catalytic electrodes heretofore has been confronted with the problem of non-uniformity of pore size in the electrode, with the pores being of materially greater diameter in certain portions of the electrode than in other portions thereof. This non-uniform pore size is unsatisfactory as it results in "drowning" of the pores by the electrolyte as contrasted with the desired optimum three phase contact of liquid electrolyte, solid catalyst and oxygen-containing gas in the pores of the electrode. Further, the problem has existed in the preparation of such diffusion electrodes of the electrode being insufficiently porous so as to require the application of high pressures for supplying the gaseous fuel and oxidizer gas to assure the fuel and oxidizer gas passing into the interior of the porous electrode to establish the three phase contact between the gas, liquid electrolyte and solid catalyst. As a result of the high gas pressures, the electrodes tend to fracture and break up and especially when the electrodes are thin which is usually the case. At the opposite extreme, the problem has been confronted of the electrode being too porous and, as a result too weak to be utilizable.

Use of ferrous metals such as iron for forming the electrodes is also unsatisfactory as the iron will corrode with acid electrolytes. The use of electrodes fabricated entirely of acid-resistant precious metals, e.g. platinum, is also known. However such electrodes are impractical because very expensive due to the high cost of the precious metal.

In accordance with the present invention, fuel cells are provided having electrodes which overcome the difficulties encountered in the use of electrodes previously mentioned. The fuel cell comprises an oxidizer electrode and a fuel electrode, and an acid electrolyte contacting and wetting a surface of each electrode. The fuel electrode and/or the oxidizer electrode and preferably all electrodes comprise a porous coherent skeletal mass of titanium with the mass having a porosity within the range of about 40%–75% porosity. The pores of the skeletal mass are uniformly or substantially uniformly distributed throughout the mass, and of uniform or substantially uniform size, preferably within the range of between 8 and 15 microns inclusive in size, and a platinum group metal as catalytically active material is deposited on the surfaces of the pores of the skeletal mass. Means are provided for passing a gaseous organic fuel into contact with a surface of the fuel electrode, and another means is provided for passing an oxygen-containing gas into contact with a surface of the oxidizer electrode.

It is important that the titanium skeletal mass not have a porosity much below 40% inasmuch as at much below 40% porosity, very high pressures are required for supplying the gaseous fuel and oxygen-containing gas to assure the fuel and oxidizer reaching the interior of the porous skeletal mass to establish the three phase contact between gas, electrolyte and catalyst with the result the electrodes tend to fracture and break up, especially when relatively thin, due to the high pressure. However, when the skeletal body portions of titanium are made thicker to withstand the high pressures, the difficulty is encountered during the sintering in the preparation of the skeletal body portion that the titanium particles in the central or interior portion of the mass do not sinter in the same manner as do titanium particles in the outer portions and surface layers of the mass. The result is undesirable non-uniform size pores with larger size pores in the central portion of the skeletal body portion than in the outer and surface portions thereof. With a porosity much above 75% porosity, relatively low strength electrodes result, non-uniformity of pore size results, and the danger of "drowning" of the pores by the electrolyte is appreciable. By "porosity" used herein is meant the percentage of the porous skeletal titanium mass that is void, i.e., empty space. Thus a 40% porosity means such porous skeletal mass with 40% of its volume void, while a 75% porosity designates such skeletal mass with 75% of its volume void.

The porosity of about 40%–75% of the skeletal mass is provided by a careful observance of the sintering temperature and sintering time within the sintering temperature range and for the times hereinafter disclosed.

The pores are preferably of uniform or substantially uniform size within the range of between 8 and 15 microns in average size, i.e. diameter, for the reason such size pores are relatively easily obtained, and give good results in the gas diffusion electrode. On the contrary smaller size pores, for instance of average pore diameter of 3 or 4 microns, are difficult and troublesome to obtain for the reason that to obtain such smaller size pores, a troublesome pressing operation is required which usually results in undesirable non-uniformity of pore size with the pores being of relatively large size in certain portions of the compact and of appreciably smaller size in other portions thereof.

The porous skeletal mass of the catalytic electrode of this invention is prepared by either a slip casting procedure followed by sintering, or by compacting with pressure followed by sintering. The slip casting procedure is preferred for the reasons there is better control of pore size and pore uniformity, and a materially greater number of the pores are interconnected with the slip casting. On the other hand, with compacting involving the application of pressure to the titanium particles, the particles are jammed more closely together with the result the resulting structure has less uniform size pores. Further, with the pressure compacting, many of the narrower interconnecting passageways between pores are closed off with the result the pores become isolated disconnected chambers serving no useful purpose for establishing the desired contact between the reactant gas, electrolyte and catalyst. However, by the slip casting technique and by employing titanium particles of uniform or substantially uniform size and especially within the preferred size range specified herein, a cast is obtained which automatically and consistently has uniform or substantially uniform size pores uniformly distributed through the mass, and with all or virtually all of the pores interconnected. After the formation of the porous coherent skeletal mass, a platinum group metal, e.g. platinum, palladium, rhodium, ruthenium, osmium or iridium is deposited as catalyst on the surfaces of the pores of the skeletal mass. The platinum group metal is deposited on the surfaces of the pores located both on the surface of the skeletal mass and in the interior thereof. The preferred catalyst is platinum.

More specifically, in the preferred preparation, a coherent skeletal mass is prepared by forming a slurry or slip of titanium powder particles of uniform or substantially uniform particle size in a liquid, for instance water. This slurry is preferably formed by grinding the larger size titanium particles, preferably in water or other inert liquid, to smaller size particles and then removing by screening or otherwise the "off size" particles, i.e. of size not desired. The pores may be of average size as large as 50 microns but are preferably within the range of between 8 and 15 microns as hereinbefore disclosed. In obtaining uniform or substantially uniform pores of evarage size of 8 microns, titanium particles of size passing a 325 mesh sieve and retained on a 400 mesh sieve are utilized. In obtaining such pores of average size of 15 microns, titanium particles of size passing a 270 mesh sieve and retained on a 375 mesh sieve are utilized. For obtaining such pores of average size of 50 microns, titanium particles of size passing a 100 mesh sieve and retained on a 270 mesh sieve are utilized. Sieve sizes are in accordance with the U.S. sieve series.

A deflocculant is preferably added to the casting slurry, prior to its transfer into the mold, in minor amount sufficient to prevent flocculation of the titanium particles and preferably in amount from about 0.2%–0.5% by weight (based on the titanium). Exemplary of the deflocculants are sodium alginate and ammonium alginate.

The slurry is then introduced into a dry porous mold, which is usually made of plaster of paris. The mold absorbs water of the slurry to build up at the bottom of the mold a coating of porous titanium as a liner or layer of even thickness conforming to the shape of the mold. The electrodes are typically made as thin discs or plates and for casting such discs or plates, a plaster of paris mold of the desired dimensions is utilized.

After a sufficient time has passed after the pouring of the slurry into the mold to give a layer of the desired thickness on the mold surface, the excess slurry is removed from the mold, for instance, by pouring. The resulting porous casting is then sintered at a temperature preferably in the range of between about 700° C. and about 1200° C. and preferably in a high partial vacuum of typically $0.5 \times 10^{-4}$ mm. of Hg to bond the particles together to obtain the porous coherent skeletal mass.

In preparing the porous coherent skeletal mass by pressure compacting and sintering, a mass of titanium powder of uniform or substantially uniform particle size within the size range previously disclosed herein, is packed in a mold of the desired shape and size. Pressure is then applied to the powder mass, for instance by means of a hand press such as an arbor press, to form the compact. The mold is of a heat refractory material, for instance quartz, which will stand up at the elevated temperature of sintering and in a high partial vacuum and remain inert to the metal at those conditions. The mold is then placed in a suitable furnace, for instance an electric furnace, which is preferably evacuated at room temperature for purpose of withdrawing by suction occluded air and other gases from the compact. While maintaining a high partial vacuum, which is typically $0.5 \times 10^{-4}$ mm. of Hg, the heat of the furnace is raised to the sintering temperature previously disclosed herein and maintained at such sintering temperature for a time sufficient to obtain a coherent porous skeletal mass of a porosity between about 40% and 75% porosity. When the sintering is completed, the mold and product are slowly cooled in the partial vacuum to room temperature. The sintering can also be carried out in a gas inert to titanium, for instance a gas of the Zero Group of the Periodic Table, e.g. helium, neon, or argon.

Whether slip-cast or compacted, temperature for sintering the titanium mass should be between about 700° C. and about 1200° C. At temperatures much above 1200° C., the titanium particles undergo "shaling" or partial fusing, which diminishes the porosity. At temperatures much below 700° C., the particles do not sinter sufficiently to cohere permanently. The sintering time is a function of the sintering temperature with longer sintering times required for lower sintering temperatures and shorter sintering times required for higher temperatures, preferably about 60–70 minutes for a sintering temperature of 700° C. and about 30–40 minutes for a sintering temperature of 1200° C. By a careful observance of the sintering temperatures and sintering times, a porous coherent skeletal titanium mass is attained of porosity within the range previously disclosed herein.

The platinum group metal catalyst can be deposited on the surfaces of the pores in the interior and also on the surface of the coherent porous skeletal mass by treating, for instance by immersing or otherwise, the skeletal mass in a solution of a thermally decomposable compound of the platinum group metal, or a mixture of thermally decomposable compounds of different platinum group metals, followed by heating the treated skeletal mass to decompose the compound and deposit the platinum group metal. For example, when platinum is used the porous titanium compact may be immersed in an aqueous solution of $H_2PtCl_6$, followed by heating the thus-treated skeletal mass at 450° C. to decompose the compound to deposit platinum metal on the surfaces of the pores in the interior and on the surface of the skeletal mass. When palladium is the catalytic material, the thermally decomposable compound may be $PdCl_2$; with rhodium as catalyst the thermally decomposable compound may be $RhCl_3$; and with ruthenium as catalyst, the decomposable compound may be $RuCl_3$. The resulting platinum group metal-impregnated skeletal mass may then be washed to remove any residual chlorine present.

To facilitate attaining a higher porosity in the skeletal mass, within the porosity range previously specified, a pore former, for instance carnauba wax, can be admixed with the titanium particles during formation of the slip casting slurry or prior to compacting and sintering. The pore former is volatilized during the sintering to form additional pores.

The platinum group metal is present in the porous skeletal titanium mass in amount of preferably from about 0.1–10 weight percent (based on skeletal mass plus catalytic metal), more preferably about 0.1–5 weight percent.

The electrolyte of the fuel cell of this invention is an acid electrolyte inasmuch as an alkaline electrolyte is soon rendered unusable with the organic fuels due to reaction with $CO_2$. The acid electrolyte can be, for example, dilute aqueous sulfuric acid ranging up to 5 N $H_2SO_4$, aqueous solutions of $H_3PO_4$ of up to 50 percent concentration, or a salt solution with a pH lower than 7, for instance an aqueous solution of $Na_2HPO_4$ of 50 percent concentration or an aqueous solution of 2 M $K_2SO_4$.

The invention will be more fully understood by reference to the following drawings wherein:

FIGURE 1 is a longitudinal section through a fuel cell of the present invention;

FIGURE 2 is a schematic enlarged section through an electrode of this invention comprising a porous coherent titanium skeletal mass with a platinum group metal as catalyst deposited on the surface of the pores; and FIGURE 3 is a schematic further enlarged fragmentary section through an electrode of FIGURE 2.

With reference to FIGURE 1, the fuel cell comprises a container or casing 5 having cathode and anode compartments 6 and 7 respectively. Container 5 is fabricated of "Lucite" which is a plastic material of low electrical conductivity. Valved fuel inlet and outlet 8 and 9 respectively enable supply of gaseous fuel into the anode compartment, and outflow of gaseous reaction products from such compartment.

Gaseous organic fuels which are utilized in the fuel cell of this invention include normally gaseous hydrocarbons, e.g. natural gas, methane, ethane, propane and butane, as well as normally liquid fuels that are easily vaporizable, e.g. methanol and formaldehyde.

The oxidizer is introduced into the cell, through inlet 10 and the cathode effluent evolves through valved outlet 11. Oxidizers used include, for instance air, oxygen-enriched air, or oxygen per se. Valved purge outlets 13 and 14 are provided for purposes of purging out the air with an inert gas, say $N_2$, prior to introducing the reactant.

Electrodes 15 and 16 are gas diffusion electrodes and comprise a porous coherent titanium skeletal mass with the platinum group metal as catalyst 21 deposited on the surfaces of its pores located both in the interior of the mass and also on the surface of the mass. As shown in more detail in FIGURES 2 and 3, the porous skeletal mass of titanium of electrode 16 has pores 18 of substantially uniform size which are substantially uniformly distributed throughout the mass. Pores 18 are interconnected by smaller diameter channels or passages 17, to communicate the gas feed side 19 of the electrode with the liquid electrolyte side 20. By reason of the substantially uniform size of the pores 18, an optimum three phase interface 22 is formed within the pores 18 between the gas, liquid electrolyte and catalyst.

The electrodes 15 and 16 of this invention have a high degree of mechanical strength even in the form of thin plates or discs, for instance of $\frac{1}{16}''$ thickness. And in this respect, the electrodes of this invention are a material improvement over fuel cell electrodes fabricated of carbon.

Electrically conductive elements 24 and 25 are connected to the upper portion of electrodes 16 and 15 respectively and have terminals 26 and 27 respectively at their outer ends. Conductor wires 28 and 29 of an external circuit are connected to terminals 27 and 26 and incandescent lamp 30 is also connected in the external circuit. The flow of current in the external circuit due to the flow of electrons resulting from the electrochemical reaction within the fuel cell, results in incandescent lamp 30 being energized and lighting up.

The following example further illustrates the invention.

To 200 grams of −325 mesh titanium power was added 1.10 grams of sodium alginate as a deflocculant. The resulting mass was blended in an electric blender. 170 ml. of distilled water was added to the resulting mixture slowly and with stirring and a drop of ammonium hydroxide was also added during the stirring. The pH of the resulting slip or slurry was 9.47, and the viscosity was 190 centipoises.

After allowing the slip to set for a few minutes to permit air bubbles to evolve, the slip was poured into 3 plaster of paris molds each $2\frac{1}{8}''$ in diameter and $\frac{1}{4}''$ deep. The slip was permitted to set in the water absorbing molds at room temperature overnight.

The resulting wet casts were permitted to air dry in the molds and were then removed from the molds, placed on a quartz base, and sintered at 950° C. for 1 hour in a vacuum furnace at a partial vacuum of $0.5 \times 10^{-4}$ mm. Hg. The resulting structures were porous, self-sustaining skeletal masses each of porosity of about 40% and having pores of substantially uniform size and of average size of 8 microns.

These porous, coherent, skeletal masses of titanium were then immersed in an aqueous solution of $H_2PtCl_6$, followed by heating the thus-treated skeletal mass to 450° C. to decompose the $H_2PtCl_6$ to deposit platinum on the surface of the pores of the skeletal masses. The resulting catalytic composites were then washed with water to remove any residual chloride. These catalytic composites are utilized as anode and cathode in a methanol-oxygen fuel cell assembled as shown in FIGURE 1.

Methanol vapor, in a stream of nitrogen, is fed to the porous Ti anode. A mixture of 17% methanol vapor and 83% nitrogen (by volume) is obtained by bubbling a stream of nitrogen through liquid C.P. methanol at 25° C. Such mixture is fed to the dry side of the porous catalytic Ti anode and serves as the fuel for generating current.

The methanol vapor, carried on the nitrogen stream, is fed to the Ti anode at 50 cc./min. and oxygen fed to the dry side of the cathode at 50 cc./min. An aqueous solution of 5% $H_2SO_4$ is the electrolyte. The cell, operating at room temperature, produces electric current at a cell voltage in the range of 0.2–0.5 volt depending on the load.

It will be obvious to those skilled in the art that many modifications may be made within the scope of the present invention without departing from the spirit thereof, and this invention includes all such modifications.

What is claimed is:

1. A fuel cell comprising an oxidizer electrode and a fuel electrode, and an acid electrolyte contacting and wetting a surface of each electrode, at least one of the electrodes comprising a porous coherent skeletal mass of titanium having a porosity within the range of 40%–75% porosity, the pores of the skeletal mass being substantially uniformly distributed throughout the mass and of substantially uniform size, and a platinum group metal as catalytically active material deposited on the surfaces of the pores of the skeletal mass, means for passing a gaseous organic fuel into contact with a surface of the fuel electrode, and means for passing an oxygen-containing gas into contact with a surface of the oxidizer electrode.

2. The fuel cell of claim 1 wherein the catalytically active material is platinum.

3. A fuel cell comprising an oxidizer electrode and a fuel electrode, an acid electrolyte contacting and wetting a surface of each electrode, at least one of the electrodes comprising a porous coherent skeletal mass of titanium having a porosity within the range of 40%–75% porosity, the pores of the skeletal mass being substantially uniformly distributed throughout the mass and of substantially uniform size within the range of between 8 and 15 microns, and a platinum group metal as catalytically active material deposited on the surfaces of the pores of the skeletal mass, means for contacting a non-wetted surface of the fuel electrode with an organic fuel, and means for contacting a non-wetted surface of the oxidizer electrode with an oxidizer.

4. A fuel cell comprising a container, an oxidizer electrode and a fuel electrode in the container, and an acid electrolyte contacting and wetting a surface of each electrode, the electrodes each comprising a porous coherent skeletal mass of titanium having a porosity within the range of 40%–75% porosity, the pores of the skeletal mass being substantially uniformly distributed throughout the mass and of substantially uniform size within the range of between 8 and 15 microns, and a platinum group metal as catalytically active material deposited on the surfaces of the pores of the skeletal mass, means for passing an organic gaseous fuel into contact with a non-wetted surface of the fuel electrode, and means for passing an oxygen-containing gas into contact with a non-wetted surface of the oxidizer electrode.

5. The fuel cell of claim 4 wherein the catalytically active material is platinum.

6. A process for the production of electrical energy, which comprises contacting a catalytic fuel electrode of a fuel cell with a gaseous fuel, the fuel electrode comprising a porous, coherent skeletal mass of titanium having a porosity with the range of 40%–75% porosity, the pores of the skeletal mass being substantially uniformly distributed throughout the mass and of substantially uniform size, and a platinum group metal as catalytically active material deposited on the surfaces of the pores of the skeletal mass, and contacting an oxidizer electrode of the fuel cell with an oxidizing gas, the oxidizer electrode and the fuel electrode both being in contact with an acid electrolyte.

References Cited

UNITED STATES PATENTS

| | | | |
|---|---|---|---|
| 1,848,438 | 3/1932 | Sieger et al. | 29—182.1 |
| 2,313,070 | 3/1943 | Hensel et al. | 29—182.1 |
| 2,581,252 | 1/1952 | Goetzel et al. | 29—182.1 |
| 2,631,115 | 3/1953 | Fox. | |
| 3,097,974 | 7/1963 | McEvoy et al. | |
| 3,254,015 | 5/1966 | Steele | 204—290 |
| 2,716,670 | 8/1955 | Bacon | 136—86 |
| 3,226,263 | 12/1965 | Oswin | 136—120 |
| 3,236,693 | 2/1966 | Caesar | 136—86 |
| 3,248,214 | 4/1966 | Kroeger et al. | 136—86 X |

FOREIGN PATENTS 233,388  2/1959  Australia.

ALLEN B. CURTIS, *Primary Examiner.*

U.S. Cl. X.R.

136—120; 117—227